US007613600B2

(12) United States Patent
Krane (10) Patent No.: US 7,613,600 B2
(45) Date of Patent: Nov. 3, 2009

(54) UNIFIED PERSONALIZATION

(75) Inventor: Rolf Krane, Wiesloch (DE)

(73) Assignee: SAP AG, Walldorf (DE)

( * ) Notice: Subject to any disclaimer, the term of this patent is extended or adjusted under 35 U.S.C. 154(b) by 707 days.

(21) Appl. No.: 10/746,272

(22) Filed: Dec. 24, 2003

(65) Prior Publication Data

US 2005/0149206 A1 Jul. 7, 2005

(51) Int. Cl.
*G06F 17/20* (2006.01)
*G06F 3/00* (2006.01)

(52) U.S. Cl. .......................................... 704/1; 715/762
(58) Field of Classification Search ................. 715/744, 715/745, 747, 762, 765, 811
See application file for complete search history.

(56) References Cited

U.S. PATENT DOCUMENTS

| | | | | |
|---|---|---|---|---|
| 5,959,624 A * | 9/1999 | Johnston et al. | ............. | 715/746 |
| 6,307,574 B1 * | 10/2001 | Ashe et al. | .................. | 715/765 |
| 6,483,523 B1 * | 11/2002 | Feng | ......................... | 715/745 |
| 6,509,913 B2 * | 1/2003 | Martin et al. | ............... | 715/762 |
| 6,633,315 B1 * | 10/2003 | Sobeski et al. | ............. | 715/762 |
| 6,891,552 B1 * | 5/2005 | Bush | ......................... | 715/762 |
| 6,915,486 B2 * | 7/2005 | Li et al. | ....................... | 715/765 |
| 6,934,915 B2 * | 8/2005 | Rudd et al. | .................. | 715/765 |
| 7,058,895 B2 * | 6/2006 | Kautto-Koivula et al. | ... | 715/744 |
| 7,123,700 B1 * | 10/2006 | Weaver et al. | ............ | 379/88.19 |
| 2005/0076306 A1 * | 4/2005 | Martin et al. | ................ | 715/747 |
| 2007/0180386 A1 * | 8/2007 | Ballard et al. | ............... | 715/744 |

* cited by examiner

*Primary Examiner*—Richemond Dorvil
*Assistant Examiner*—Douglas C Godbold
(74) *Attorney, Agent, or Firm*—Finnegan, Henderson, Farabow, Garrett & Dunner, L.L.P.

(57) ABSTRACT

Methods and apparatus, including computer systems and program products, for personalizing applications. Context information and an identification of a first user interface (UI) element is transmitted to a repository. Personalization information for the first UI element is received from the repository, and used to display the first UI element in an application user interface. The personalization information includes first personalization data corresponding to a first personalization associated with the context information, and second personalization data corresponding to a second personalization associated with the context information. In some embodiments, a unified personalization framework, which can include a common user interface, a common functional interface, a common data model, and a common storage area, provides a uniform approach that can be used to personalize multiple types of UI elements in multiple applications and at multiple levels.

21 Claims, 7 Drawing Sheets

UNIFIED PERSONALIZATION

BACKGROUND

The present invention relates to adaptations of computer applications.

Computer applications typically require different levels of adaptation or personalization. For example, an application developer can design a core configuration for an application that specifies basic properties and settings for the application. A solution configuration can be used to adapt or personalize the core configuration for a particular industry. A further level of personalization is the customization of the application, which is typically performed by a customer, and which can include adapting the application for a particular company or for a particular country. Yet another level of personalization is user personalization, which can include adapting the application for a particular department or for a particular user.

The personalization of an application usually involves adaptation of the user interface (UI) elements in the application (e.g., buttons in an application toolbar, tabs in a tab strip, columns in a table, or fields in a form, including both label fields and input element fields). User interface elements can be personalized by modifying various attributes or properties associated with the elements. Such attributes and properties can include, for example, the appearance of the elements (e.g., the width, height, font, and color used to display the elements), the position of the elements, the visibility of the elements (e.g., whether the elements are shown or hidden), the enablement of the elements (e.g., whether the elements are enabled or disabled), and the text associated with the elements (e.g., documentation text, tooltip text, etc.). For input elements, attributes and properties can also include default values, value lists (e.g., a list of most recently used values), the mandatory nature of the elements (i.e., whether input is required to be provided), and extended value help. As a result of such personalization, the users of an application may have access to different information or operations associated with the application, depending on the particular adaptations (including the different levels of personalization described above) that were performed to the application.

The different levels and types of personalization for an application can occur at different stages in the development and deployment of the application, and can involve the use of different tools, different interfaces, and different storage areas for the various personalizations.

SUMMARY

The present invention provides methods and apparatus, including computer program products, that implement techniques for personalizing applications.

In one aspect, the techniques feature a computer program product with instructions that are operable to cause data processing apparatus to transmit context information and an identification of a first user interface (UI) element to a repository, receive personalization information from the repository for the first UI element, and display the first UI element in an application user interface according to the personalization information. The personalization information includes first personalization data corresponding to a first personalization associated with the context information, and second personalization data corresponding to a second personalization associated with the context information.

Advantageous implementations can include one or more of the following features. The context information, which can include an identification of a user and an identification of an application, can be specified in a Universal Resource Identifier (URI).

The instructions can be further operable to cause the data processing apparatus to receive user input with additional personalization data for the first UI element, and display the first UI element in the application user interface according to the additional personalization data. The user input can be provided by a user in the application user interface. The instructions can be further operable to cause the data processing apparatus to transmit the additional personalization data to the repository.

In addition, the instructions can be operable to cause the data processing apparatus to receive different user input with different personalization data for a second UI element that is of a different type than the first UI element, and display the second UI element in the application user interface according to the different personalization data.

A first personalization function associated with the first UI element can be invoked to receive the user input, and a second personalization function associated with the second UI element can be invoked to receive the different user input. The first personalization function and the second personalization function can be implementations of a function defined in a common interface.

Receiving the user input can include displaying a first personalization user interface associated with the first UI element. Receiving the different user input can include displaying a second personalization user interface associated with the second UI element. The first personalization user interface and the second personalization user interface can derive from a common personalization user interface.

A first data structure can be used store the additional personalization data, and a second data structure can be used to store the different personalization data. The first data structure and the second data structure can derive from a common data structure.

In another aspect, the techniques feature a computer program product with instructions that are operable to cause data processing apparatus to receive context information and an identification of a first user interface (UI) element, select first personalization data from a collection of personalization data, select second personalization data from the collection of personalization data, and combine the first personalization data and the second personalization data to create personalization information for the first UI element. The first personalization data corresponds to a first personalization for the first UI element, and the second personalization data corresponds to a second personalization for the first UI element. The first personalization and the second personalization are both associated with the context information. The collection of personalization data includes additional personalization data for the first UI element, and different personalization data for a second UI element.

Advantageous implementations can include one or more of the following features. The instructions can be further operable to cause the data processing apparatus to transmit the personalization information to an application.

The instructions can also be operable to cause the data processing apparatus to receive new personalization data associated with the first UI element, select applicable personalization data from the collection of personalization data based on a role, and modify the applicable personalization data based on the new personalization data.

Additionally, the instructions can be operable to cause the data processing apparatus to receive a proposed modification to selected personalization data from the collection of personalization data, identify a role associated with the proposed modification, and determine whether the proposed modification is authorized for the role.

The instructions can be further operable to cause the data processing apparatus to receive a proposed modification to selected personalization data from the collection of personalization data, where the selected personalization data corresponds to a selected personalization, and determine whether the proposed modification is permitted by a different personalization.

In another aspect, the techniques feature a computer program product with instructions that are operable to cause data processing apparatus to transmit context information and an identification of a selected group of user interface (UI) elements to a repository. The repository includes personalization data corresponding to one or more available personalizations for each UI element in a collection of UI elements. The instructions are further operable to cause the data processing apparatus to receive personalization information from the repository for each UI element in the selected group of UI elements. The personalization information contains personalization data corresponding to one or more applicable personalizations for each UI element. The applicable personalizations include a selection of one or more of the available personalizations for each UI element based on the context information. The instructions are also operable to cause the data processing apparatus to display each UI element in the selected group of UI elements in an application user interface according to the personalization information for the UI element.

The instructions are additionally operable to cause the data processing apparatus to receive first user input and second user input. The first user input includes an invocation of application functionality associated with one or more of the UI elements in the selected group of UI elements. The second user input includes an invocation of personalization functionality associated with one or more of the UI elements in the selected group of UI elements. The personalization functionality is defined in a common personalization interface. The second user input also includes new personalization data for one or more of the UI elements in the selected group of UI elements.

The instructions are additionally operable to cause the data processing apparatus to display the selected group of UI elements in the application user interface according to the new personalization data, and transmit the new personalization data and a specification of a role to the repository. The role indicates one or more of the available personalizations in the repository to which the new personalization data applies.

The techniques described herein can be implemented to realize one or more of the following advantages. The techniques can be used to implement a unified personalization framework. The framework provides a uniform approach to personalization that can be used to personalize multiple (or all) UI elements in an application. The same uniform approach can be used to personalize multiple types of UI elements in multiple applications and at multiple levels. The framework can include a common user interface, a common functional interface, a common data model, and a common storage area, which simplifies personalization because the same techniques can be used to provide personalization support for different UI elements, and because users do not need to be trained to use different tools to personalize different controls. The use of common personalization storage (e.g., a common repository) makes it easy to maintain personalization information, and enables users to adjust the scope and level across which a given personalization is effected. A personalization made at one level can override a personalization made at another level, or be propagated to other levels. The ability to personalize user interfaces can be specified by organizational units as well as by roles. Various methods and protocols (e.g., web services) can be used to select and to update personalizations.

Moreover, the techniques described herein can be used to integrate personalization functionality directly into applications. Such functionality can be invoked at application runtime (i.e., while an application is running), thereby enabling users to get immediate feedback regarding their personalizations. The effect of a given personalization can be seen immediately and in a WYSIWYG (what you see is what you get) fashion. The uniform approach specified above provides users with a consistent experience in personalizing UI elements and applications. One implementation of the invention provides all of the above advantages.

These general and specific aspects can be implemented using a computer program, a method, a system or apparatus, or any combination of computer programs, methods, or systems. The details of one or more embodiments of the invention are set forth in the accompanying drawings and in the description below. Other features, objects, and advantages of the invention will be apparent from the description, the drawings, and the claims.

DESCRIPTION OF DRAWINGS

Like reference symbols in the various drawings indicate like elements.

DETAILED DESCRIPTION

Figure 1:
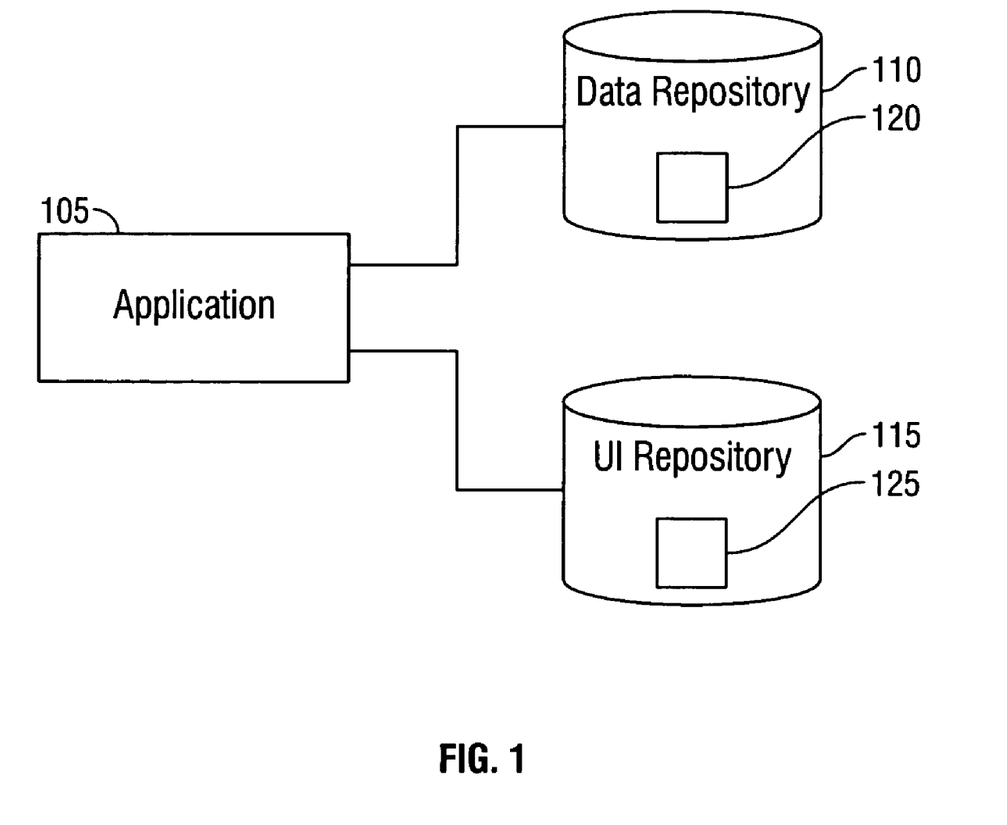
FIG. 1 illustrates a block diagram of an application with integrated personalization functionality.
Figure 2A:
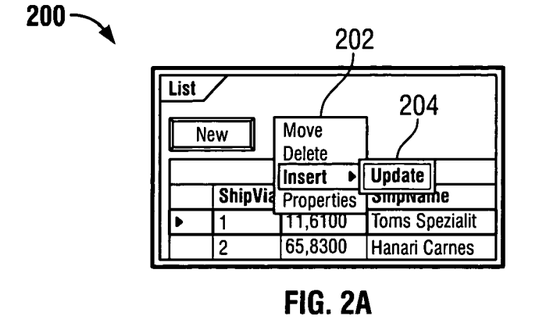
FIGS. 2-4 illustrate the personalization of UI elements in an application.
Figure 2B:
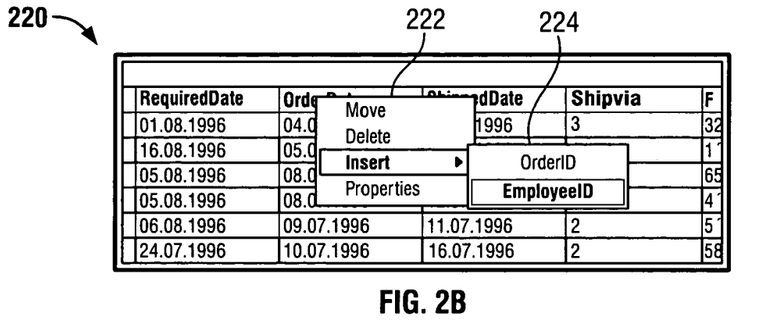
Figure 2C:
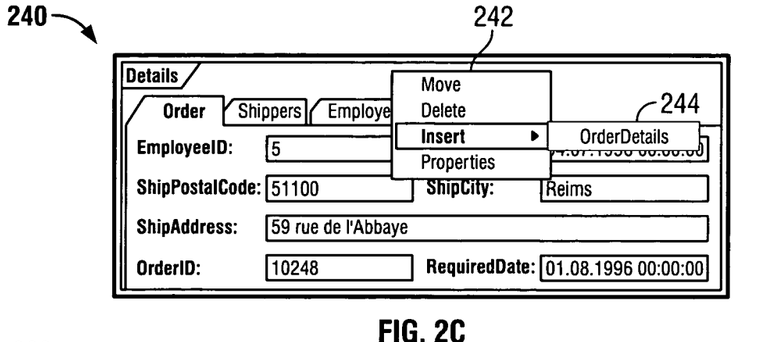
Figure 2D:
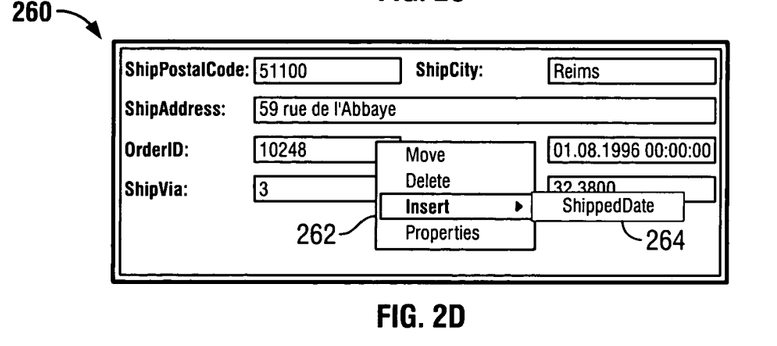
Figure 3A:
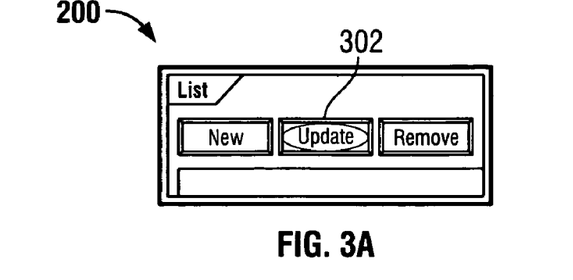
Figure 3B:
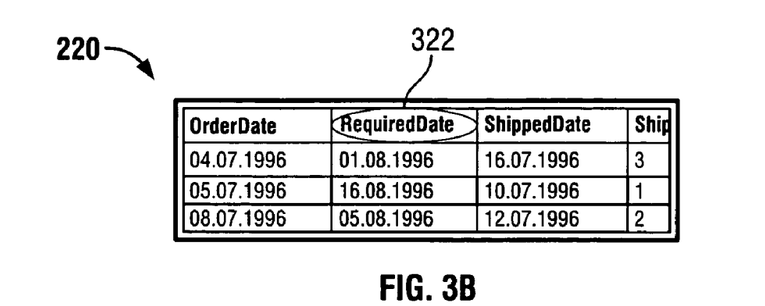
Figure 3C:
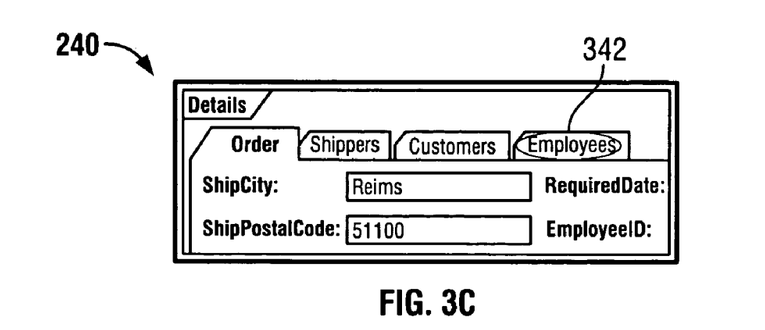
Figure 3D:
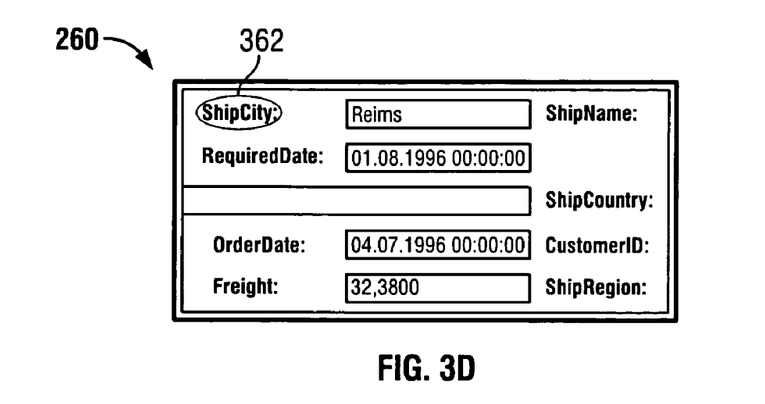
Figure 4A:
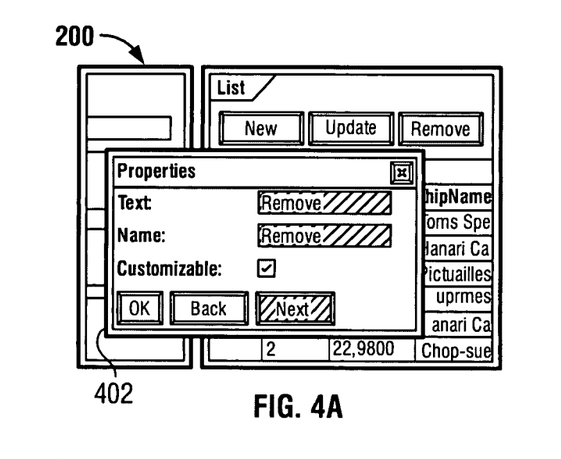
Figure 4B:
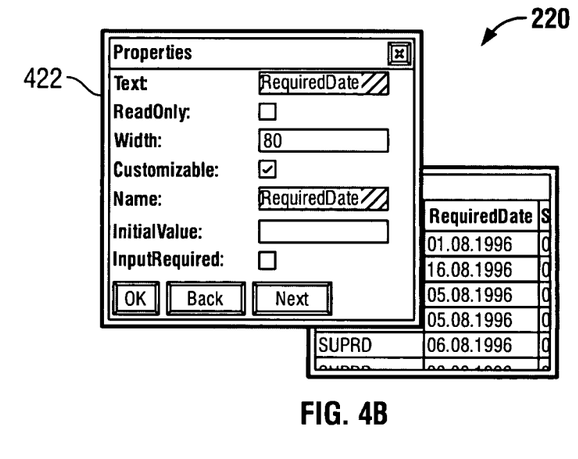
Figure 4C:
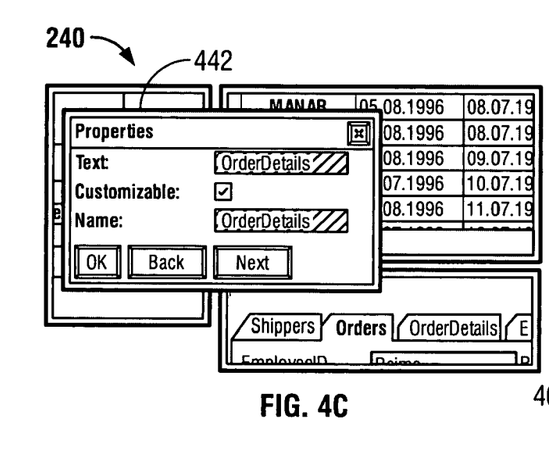
Figure 4D:
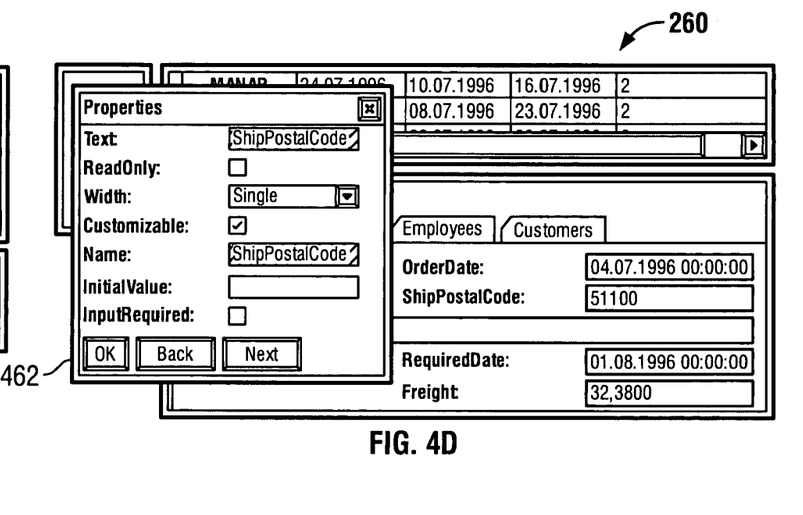

FIG. 1 illustrates a computer program application 105 that uses a unified framework for personalization. As explained below, the unified framework can be used to provide multiple levels of personalization for the user interface elements in the application 105. In one implementation of the personalization framework, the application 105 communicates with a data repository 110 and a user interface (UI) repository 115. The data repository 110 and UI repository 115 can be located on the computer at which the application is running, but they can also be located remotely and accessed by the application over conventional communication links. The data repository 110 is used to store application data 120, while the UI repository 115 is used to store UI elements and personalization data 125 for the UI elements. The UI repository 115 is similar to a toolkit for the application 105, in that the UI repository 115 contains multiple UI elements that can be used in the user interface of the application 105. Moreover, the UI repository 115 can be used to store multiple personalizations (e.g., multiple levels of personalization) for each UI element.

Each personalization can include a set of personalization data that specifies one or more attributes or properties for a given UI element. A personalization can have a scope that indicates where the corresponding personalization data is to be used. For example, a given personalization for a UI element may apply to an application, meaning that the corresponding personalization data is to be used in displaying the UI element within that application. Or the personalization may be part of a solution configuration for the application, meaning that the personalization data is to be used in displaying the UI element within a particular variation or configuration of the application. As another example, the personalization may apply to a specific company or to a specific user within a company, meaning that the configuration data is to be used in displaying the UI element within applications for that company or that user.

In some implementations, multiple personalizations can apply to a given UI element. Each such personalization can represent a level of personalization, and the personalizations from two or more levels can be combined to determine how the UI element is to be displayed in a given context. For example, for a particular UI element, a core configuration level personalization may specify that the UI element is to be displayed in blue, a solution configuration level personalization may specify that the UI element is to be disabled, and a user level personalization may specify that the UI element is to be displayed using 16-point font. In a context where all three levels of personalization apply—i.e., when the specified user is running the specified configuration of the specified application—the three personalizations can be combined so that the UI element is displayed using all three of the specified attributes (blue color, disabled functionality, and 16-point font).

The application 105 in FIG. 1 can include integrated personalization functionality. A user of the application 105 can perform personalization of the application 105 at runtime (i.e., while the application is running), and immediately see the result of the personalization (e.g., in the application user interface).

In one implementation, the running application 105 provides a user with two options for personalization. In the first option, a personalization performed by the user applies to the UI elements only while the application 105 is running. In the second option, changes to the UI elements are stored in the UI repository 115. In one implementation, the personalization changes made by a user are saved automatically, and there is no need for a save dialog to ask the user whether he or she would like to save the personalization changes.

The types of personalization changes that a user can make to the application 105 may vary depending on the permissions that the user has. Permissions can be determined according to various criteria—e.g., organizational factors (e.g., the department to which the user belongs), or roles or tasks assigned to the user. In one implementation, personalization meta roles are given to users. Personalization meta roles can include, for example, core application developer, industry solution developer, application user, and so forth. The personalization meta role assigned to a user can be used to determine the types of changes that the user can make, as well as the scope of the changes (e.g., the levels to which the changes will apply).

As described above, personalization functionality can be integrated directly into applications. FIGS. 2-4 illustrate the personalization of UI elements in an application. The figures show four portions of an application user interface—a portion 200 that shows button UI elements (e.g., the button labeled "New"), a portion 220 that shows column UI elements (e.g., the column labeled "RequiredDate"), a portion 240 that shows tab UI elements (e.g., the tab labeled "Order"), and a portion 260 that shows a form with text field UI elements (e.g., the field labeled "ShipPostalCode").

A user can select a UI element or a portion of a user interface to be personalized in various ways. For example, a user can execute an action (e.g., right-clicking) on an input device (e.g., a mouse). When the user has selected a UI element or a portion of a user interface, a menu with a list of options can be shown to the user. The options can include the operations that can be performed to the selected UI element or portion of the user interface. In one implementation, a common user interface is used for personalization, regardless of the type of UI element being personalized. For example, in FIG. 2, the menus 202, 222, 242, and 262 are identical, showing the same four operations regardless of whether the UI element being personalized is a button, column, tab, or field. The operations in each case include moving a selected UI element, deleting a selected UI element, inserting a new UI element, and changing the properties of the selected UI element. In the example in FIG. 2, the insert operation has been selected in each case, and again, a consistent user interface is provided in each case through the display of an additional menu that lists the possible UI elements that can be inserted. For example, menu 204 shows that an "Update" button can be inserted in the user interface portion 200, menu 224 shows that two columns (labeled "OrderID" and "EmployeeID") can be inserted in user interface portion 220, menu 240 shows that an "OrderDetails" tab can be added to user interface portion 240, and menu 264 shows that a "ShippedDate" field can be added to user interface portion 260.

FIG. 3 illustrates how UI elements that have been selected can be identified as "marked" to a user, for example, in order to be moved to a different portion of the application user interface. In FIG. 3, the marked elements (e.g., the marked button 302, the marked column 322, the marked tab 342, or the marked field 362) are identified by ovals, but any type of marking can be used, such as highlighting, changing colors, displaying an associated text label in boldface font, and so forth. In one implementation, a uniform marking is used regardless of the type of control, thereby keeping the personalization user interface consistent across all UI elements.

Various operations can be performed on a UI element that has been marked. For example, a marked UI element can be moved to a new location in the display (e.g., by performing a "drag-and-drop" operation with a mouse). Another operation that can be performed is editing the attributes or properties of a marked UI element. This can be done through the use of a dialog box, as shown in FIG. 4. Dialog boxes 402, 422, 442, and 462 are used to set the properties of a button, a column, a tab, and a text field, respectively. In one implementation, the types of changes that a user is permitted to make depend on the user's authorization, which can be determined, for example, from a role assigned to the user. In the examples shown in FIG. 4, the user is not allowed to make certain personalization changes to button or tab properties, as can be seen from the fact that the fields for the "Text" and "Name" properties corresponding to each UI element are shown as inactive in dialog boxes 402 and 442.

In contrast, dialog box 422 shows that the user can modify various properties for a column element—e.g., the user can mark the column as read-only, modify the width of the column, define an initial value for the fields in the column, or specify that an input is required for the fields in the column. The user can make similar changes to the properties of a text field in a form, as shown in dialog box 462. One difference, though, is that the width of a text field must be selected from a drop-down menu (i.e., the user does not have the option of freely defining the width of the field). In other implementations, properties such as width and height can be changed by mouse selections and moves, and other types of elements can also be resized in a similar manner.

As described above, a personalization framework can integrate personalization functionality into applications, allowing users to personalize UI elements directly in the applications. With such a framework in place, if a user wants to personalize a UI element in an application, the user does not need to close the application, use an editor or other personalization tool in a design time environment to make one or more personalization changes, and then re-generate or re-launch the application. Instead, the user can make the changes directly in the application he or she is using. Moreover, the modifications made by the user can be displayed immediately, e.g., in a preview pane, or directly in the user interface of the application itself. For example, if a user adds a UI element to an application user interface, the new field can be displayed immediately in the application user interface. Such WYSIWYG personalization makes it easy for users to see and adjust the adaptations they make.

In some implementations, the personalization framework can include a common personalization user interface. The common personalization user interface can be used to invoke personalization operations in the same way, regardless of the type of UI element being personalized or the level or scope of personalization. For example, in FIGS. 2-4, personalization is effected through a common personalization user interface that includes a common pop-up menu for each UI element (where each pop-up menu lists the available personalization operations), a common way of marking selected UI elements, and similar dialog boxes for adjusting the properties of the UI elements.

A personalization framework can also include a common personalization interface. That is, the framework can include an implementation of a common set of functions for each UI element that can be invoked to personalize the UI element. The common set of functions can be defined in a common interface (e.g., an interface for a base class). The corresponding functions for each UI element can then be implemented in a class that derives from the base class.

The framework can also include a common data model or data structures for storing personalization information. As with the personalization functions, the common data model can be defined in a base class, and modified or expanded upon in a class for each UI element that derives from the base class. The common data model can be used in conjunction with the common personalization interface, meaning that the personalization functions and event handlers can use the data elements defined in the data model. The use of similar data structures to store personalization data for each UI element allows personalization functions to be simplified and perhaps even re-used.

Figure 5:
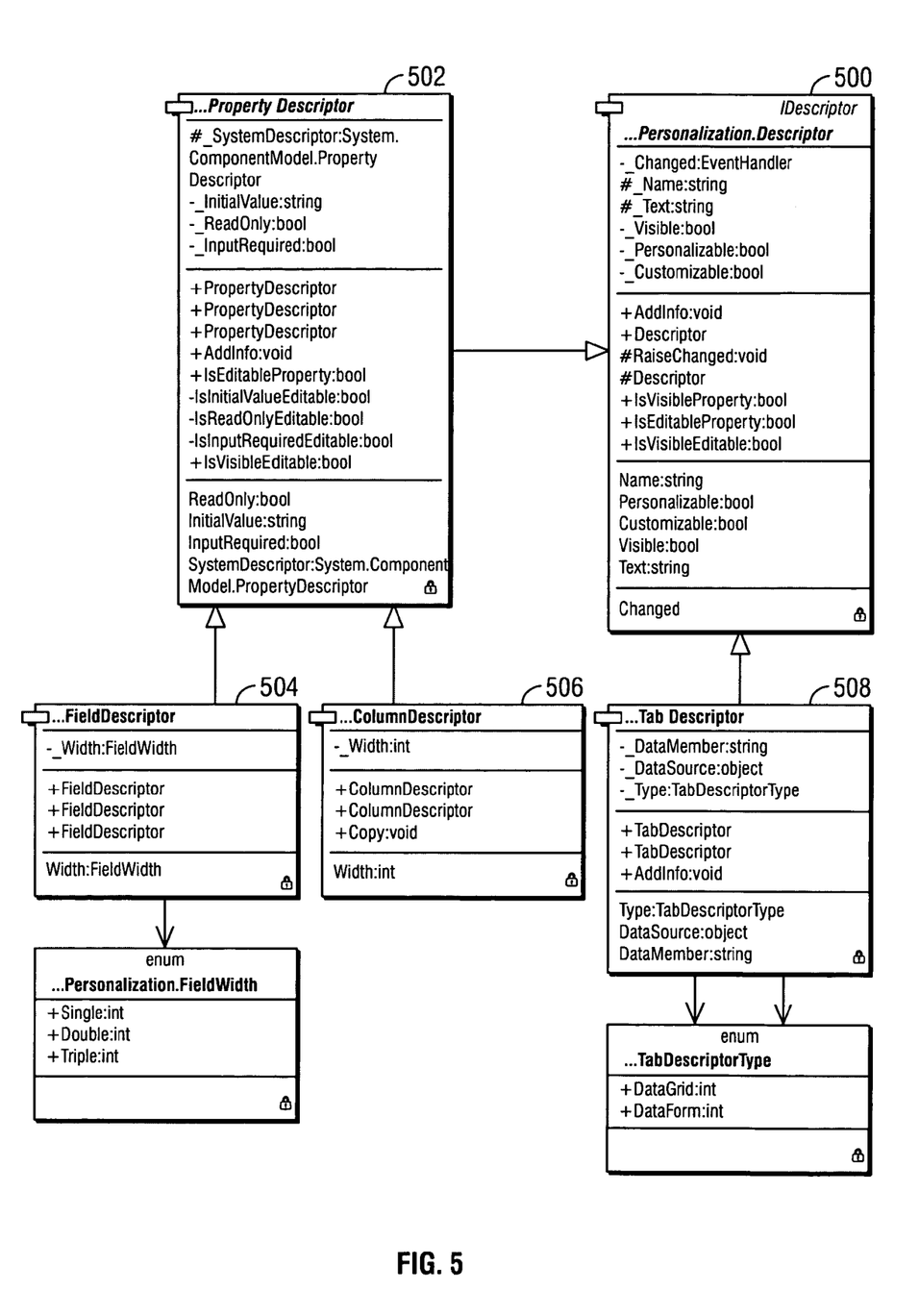
FIG. 5 illustrates a portion of a personalization data model.

FIG. 5 shows a Unified Modeling Language (UML) diagram of a portion of a personalization data model. In the example in FIG. 5, each type of UI element corresponds to a class that describes attributes or properties for UI elements of that type. For example, the classes FieldDescriptor 504, ColumnDescriptor 506, and TabDescriptor 508 represent field, column, and tab UI elements, respectively. The first two classes, FieldDescriptor and ColumnDescriptor, contain a Width data element which represents the width of a given field or column, and which can be adjusted by a user in order to modify the width of the field or column.

The classes can be built up into a hierarchy of classes, with a base descriptor class 500 serving as a base class for all UI elements. The base descriptor class 500 can include data elements that represent attributes or properties common to all UI elements. For example, the base descriptor class 500 includes the data elements Name and Text, which store the name and text associated with each UI element. The base descriptor class 500 also includes the Boolean variables Visible, Personalizable, and Customizable, which can be set or adjusted to represent whether a UI element is visible, personalizable, or customizable.

Each class that derives from the base descriptor class 500 can add data elements to represent additional attributes or properties that can be personalized. For example, as described above, the classes FieldDescriptor 504 and ColumnDescriptor 506 include a Width data element that can be used to store and adjust the width of a given field or column. Intermediate classes can be used to store properties common to multiple types of UI elements. For example, in the sample data model shown in FIG. 5, the PropertyDescriptor class 502 is used to store attributes and properties common to input UI elements. The PropertyDescriptor class 502 includes the Boolean data elements ReadOnly and InputRequired, which can be set or adjusted to represent whether a given UI element can accept input and whether such input is required. Because the two classes FieldDescriptor 504 and ColumnDescriptor 506 derive from the PropertyDescriptor class 502, those two classes will inherit the ReadOnly and InputRequired data elements.

A personalization data model can be designed in an extensible manner, so that new classes can be added to represent new types of UI elements, and new data elements can be added to represent additional personalizable properties or attributes. An example of the latter type of extension is to let users personalize input UI elements by specifying default values for the UI elements. This may be useful, for instance, to enable users to specify default values for queries that they run frequently. To accommodate such personalization, an InitialValue data element can be added to the PropertyDescriptor class 502. A user can then use that data element to specify default values for text fields and other input UI elements in an application.

The use of a common personalization user interface, a common personalization functional interface, and a common personalization data model creates a unified approach to personalization that can be used to personalize different types of UI elements in different applications, thereby providing a consistent user experience. Moreover, in some implementations, a common repository is used to store personalization data for different levels and scopes of personalization. This enables the same unified approach to be used regardless of the level or scope of a personalization. In one implementation, then, the same approach can be used for personalization, regardless of the type of UI element, the application, and the level and scope that are involved.

Figure 6:
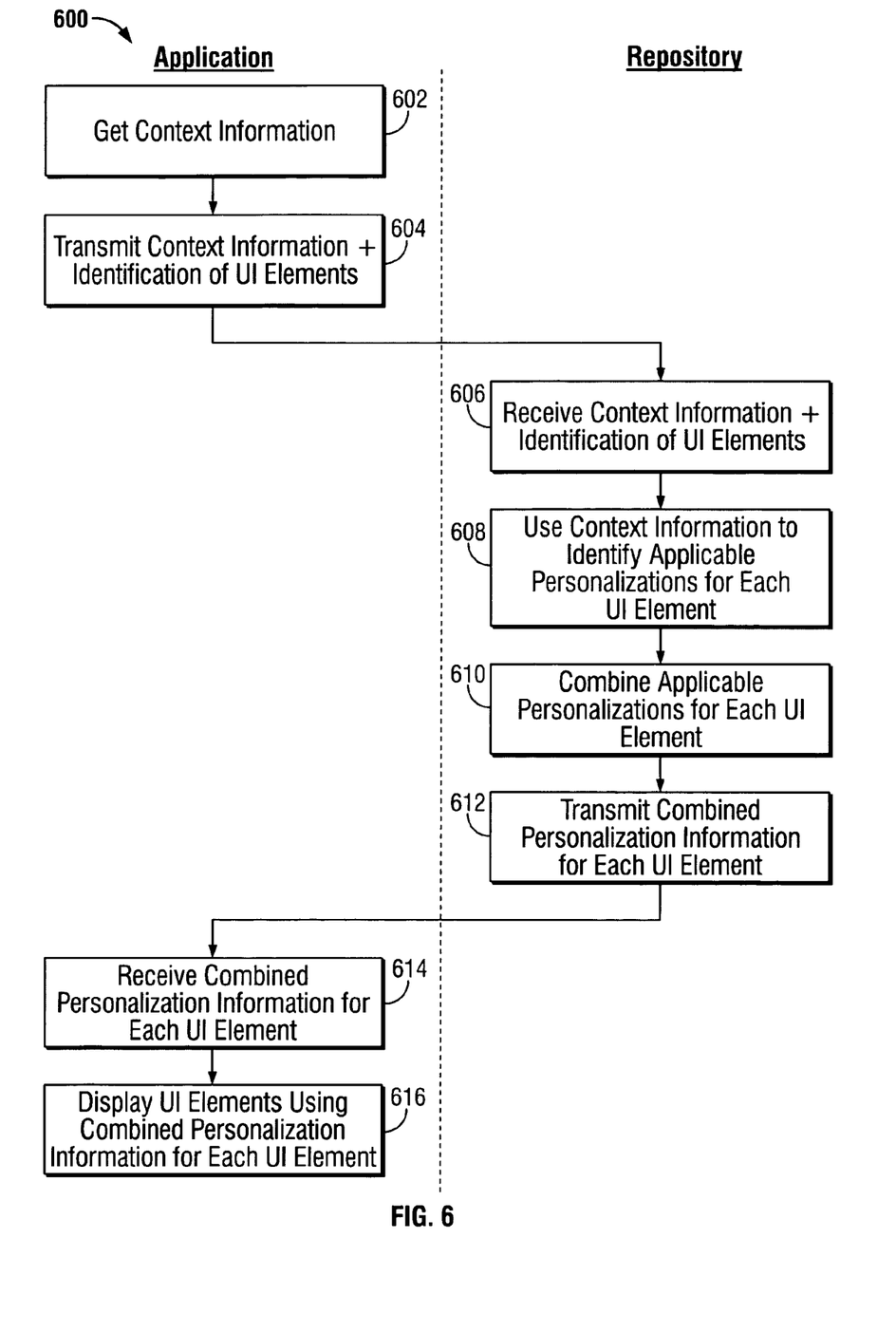
FIG. 6 illustrates a process for obtaining personalization information.

FIG. 6 illustrates an example process 600 for obtaining personalization information from a repository. An application collects context information about the context in which it is running (step 602), and transmits that information, along with an identification of one or more UI elements that are used in the application, to the repository (step 604).

The repository, which can store personalization data corresponding to multiple personalizations (e.g., multiple levels of personalization) for multiple UI elements, receives that information (step 606), and locates the applicable personalization data for each specified UI element (step 608). In one implementation, the repository locates the applicable personalization data by using a rule engine to apply a set of rules and identify the applicable personalizations based on the context information. For example, the context information transmitted to the repository can include an identification of an application, an identification of a view or form within the application, an identification of a user, and other environment settings and information that identify the environment in which the UI elements are being used (e.g., a specification of an industry configuration for the application, and a specification of the country in which the application is being used). The repository can analyze such context information to identify the applicable personalizations.

In one implementation, each personalization corresponds to one of four hierarchically arranged levels—an application or core configuration level (the top or broadest level), an industry or solution configuration level, a customer or customization level, and a user level (the bottom or most specific level). The repository can store up to four personalizations for each UI element, corresponding to the four levels of personalization. When the repository receives a request for personalization information, it can attempt to locate the relevant personalizations (based on the context information) in a cascading manner, searching first for the most specific or user level personalization, then for a customization level personalization, then for a solution configuration level personalization, and finally for a core configuration level personalization. In one implementation, the repository simply returns the personalization data corresponding to the lowest level personalization that it finds. For example, if a UI element in a given context has personalizations corresponding to the first three levels (core configuration level, solution configuration level, and customization level), but no user level personalization, the repository simply returns the personalization data corresponding to the customization level personalization.

In other implementations, the repository combines or mixes the personalization data corresponding to the applicable personalizations (step 610), thus creating combined personalization information for each UI element. Where the personalizations to be combined specify values for different attributes or properties, all the values can be included in the personalization information. Where the personalizations specify conflicting values for an attribute or property, one value can override the others. For example, a setting in a broad, high-level personalization can be overridden by a setting in a more specific, low-level personalization. For example, a core configuration for an application may specify that a UI element should be displayed in blue, but such a setting may be overridden by a user level personalization that specifies that that UI element should be displayed in red. Alternatively, a setting in a high-level personalization can override a setting in a low-level personalization. Thus, in the preceding example, a company can decide that the UI element in question should always be displayed in red, meaning in essence that the color property cannot be adjusted at the user level. In such a scenario, the repository would use the color setting specified at the company customization level, and ignore the color setting specified at the user level.

After the repository has located the applicable personalization data and generated the relevant personalization description for each UI element, it can transmit the personalization information to the application (step 612). The application receives the personalization information (step 614), and uses it to display the UI elements as appropriately personalized for the given context (step 616).

In one implementation, context information is transmitted to the repository in the form of Universal Resource Identifiers (URIs). A URI can be assembled by concatenating various environment information, including, for example, a geographic location, a user identification (ID), an application name or identification, a specification of a form within the application, and a control path in a control tree corresponding to the form. The repository can use the URI as a key to identify the applicable personalizations.

Figure 7:
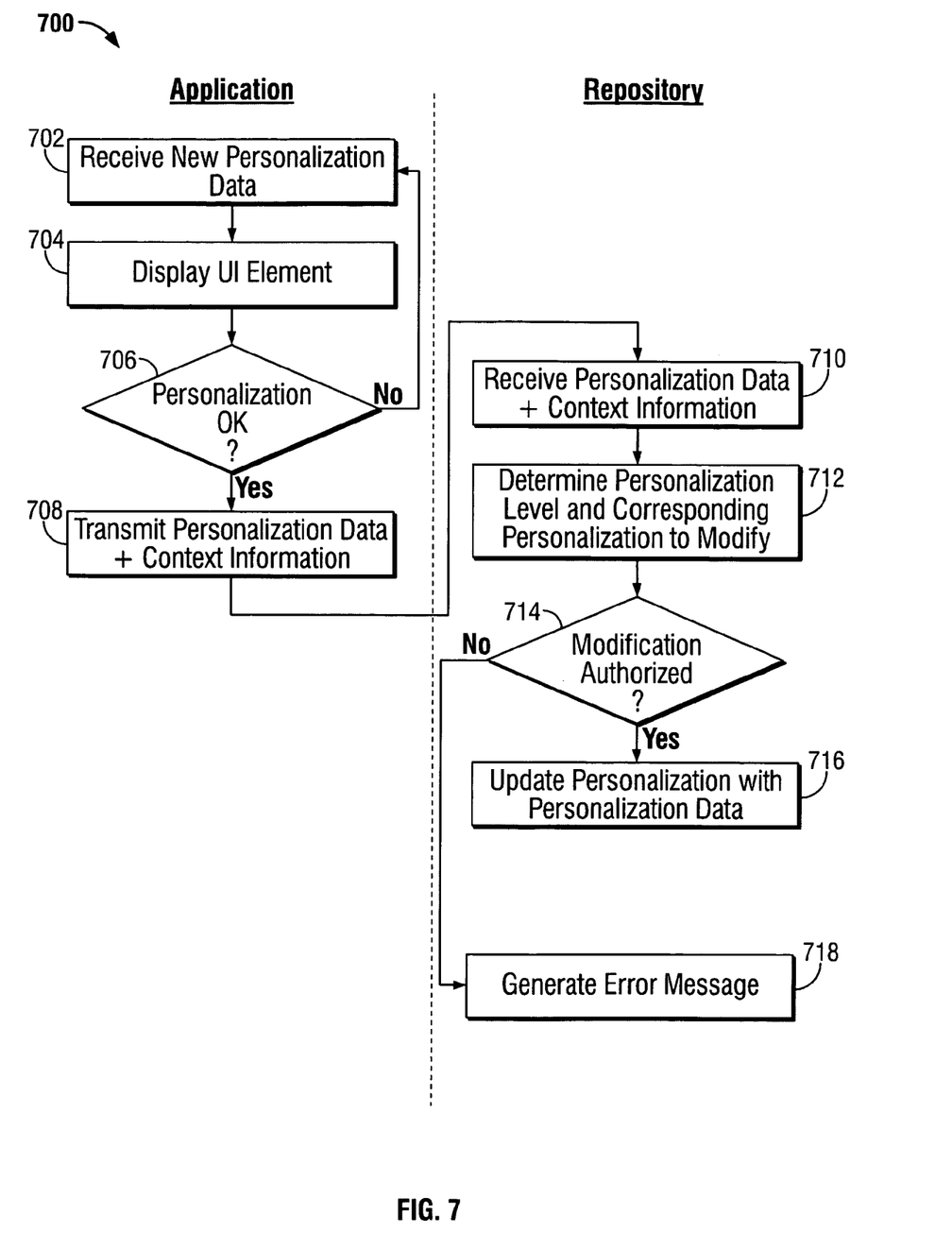
FIG. 7 illustrates a process for personalizing UI elements.

FIG. 7 illustrates an example process 700 for personalizing UI elements. Integrated personalization functionality is used to receive new personalization data for a UI element in an application (step 702). Since the personalization functionality is integrated into the application, such functionality can be invoked at application runtime, and the personalized UI element can be displayed directly in the application user interface (step 704). If the user is not satisfied with the personalization ("no" branch from step 706), he can further modify the personalization data (step 702). When the user is finally satisfied with the personalization ("yes" branch from step 706), the application can transmit the personalization data and the context information (e.g., user ID, application ID, etc.) to the repository (step 708).

The repository receives the personalization data and the context information (step 710), and determines the appropriate personalization or personalizations to modify based on the context information (step 712). In some implementations, such a determination can be based on user input (e.g., through a specification of a personalization level to which the personalization data is to be applied), or on a role (e.g., a personalization meta role associated with the user), which can be specified, for example, as part of the transmitted context information.

The repository can then determine whether the proposed modification is authorized (step 714). Such a determination can be based, for example, on the level of a proposed modification, or on a role associated with the user—e.g., the proposed modification may or may not be permitted for a given level or a given role. Such a permission or restriction can be specified, for example, in a higher level personalization (i.e., in a personalization specified for a higher level than the level being modified). If the modification is not authorized ("no" branch from step 714), the repository can generate an error message (step 718); otherwise ("yes" branch from step 714), the repository can modify the personalization data associated with the relevant personalization based on the new personalization data (step 716).

Personalization data can be read from and written into a repository, so that personalizations can be added, deleted, and modified. In addition, in some implementations, the repository is implemented using an extensible framework, so that personalizations for new types of UI elements, as well as new levels of personalization, can be added easily. An extensible framework can also make it possible to add advanced personalization functionality to the repository, such as responding to queries about available personalizations, storing deltas (i.e., changes) to personalizations, and overriding personalization data (e.g., from levels below a specified level).

In some implementations, web services are used to retrieve personalization data or information from a repository, and to select and combine relevant personalizations (e.g., personalization data corresponding to the applicable levels and scopes). Web services can also be used to store and update personalization data in the repository, and to invoke other personalization functionality. In one implementation, only two common accessors are used—one for reading and one for writing—and web services automatically determine the storage location of the UI elements and the applicable personalization settings.

The personalization mechanisms described herein can also be used in conjunction with pattern-based applications—i.e., they can be used to personalize UI elements included in UI patterns. A UI pattern is a generic, configurable application component that is used to perform a task common to a number of applications. For example, UI patterns can be defined for finding and identifying objects, for listing data, for entering data in a predefined sequence, and so forth. UI patterns can provide a number of benefits. For example, UI patterns make it possible to have a unified design for performing given tasks within and across applications. More rapid and efficient software development is possible, since the UI patterns can be reused and only have to be developed once. UI patterns also reduce maintenance requirements. The combination of UI patterns and a uniform personalization framework that integrates the personalization of UI elements directly into applications can greatly simplify application development.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results. Repository attributes, such as translated texts or documentations, can be mixed into personalization as default values, which can be overwritten by UI personalization.

What is claimed is:

1. A computer-readable storage medium storing a program for causing a computer to perform a method, the method comprising:

uniquely marking a first UI element of a user interface of a running application to distinguish the first UI element from all other elements of the user interface, wherein the user interface comprises multiple UI elements;

transmitting context information and an identification of the first UI element to a repository;

receiving personalization information from the repository for the first UI element, the personalization information comprising first personalization data corresponding to a first personalization associated with the context information, and second personalization data corresponding to a second personalization associated with the context information; and displaying the first UI element in the user interface, while the application is running, according to the personalization information.

2. The computer-readable storage medium of claim 1, wherein the context information comprises an identification of a user.

3. The computer-readable storage medium of claim 1, wherein the context information comprises an identification of the application.

4. The computer-readable storage medium of claim 1, wherein the context information is specified in a Universal Resource Identifier.

5. The computer-readable storage medium of claim 1, wherein the method further comprises:

receiving user input comprising additional personalization data for the first UI element; and displaying the first UI element in the application user interface according to the additional personalization data.

6. The computer-readable storage medium of claim 5, wherein the user input is provided by a user in the application user interface.

7. The computer-readable storage medium of claim 5, wherein the method further comprises:

transmitting the additional personalization data to the repository.

8. The computer-readable storage medium of claim 5, wherein the method further comprises:

receiving different user input comprising different personalization data for a second UI element, the second UI element being of a different type than the first UI element; and displaying the second UI element in the application user interface according to the different personalization data.

9. The computer-readable storage medium of claim 8, wherein:

receiving the user input comprises invoking a first personalization function associated with the first UI element;

receiving the different user input comprises invoking a second personalization function associated with the second UI element; and the first personalization function and the second personalization function are implementations of a function defined in a common interface.

10. The computer-readable storage medium of claim 8, wherein:

receiving the user input comprises displaying a first personalization user interface associated with the first UI element;

receiving the different user input comprises displaying a second personalization user interface associated with the second UI element; and the first personalization user interface and the second personalization user interface derive from a common personalization user interface.

11. The computer-readable storage medium of claim 8, wherein:

the additional personalization data is stored in a first data structure;

the different personalization data is stored in a second data structure; and the first data structure and the second data structure derive from a common data structure.

12. A computer-readable storage medium storing a program for causing a computer to perform a method, the method comprising:

receiving context information and an identification of a first UI element of a user interface of a running application, wherein the user interface comprises multiple UI elements;

selecting first personalization data from a collection of personalization data, the first personalization data corresponding to a first personalization for the first UI element, the first personalization being associated with the context information, the collection of personalization data comprising additional personalization data for the first UI element, and different personalization data for a second UI element;

selecting second personalization data from the collection of personalization data, the second personalization data corresponding to a second personalization for the first UI element, the second personalization being associated with the context information; and creating a first combined personalization information for the first UI element by combining the first personalization data and the second personalization data while the application is running, wherein the first personalization data defines multiple attributes of the first UI element, and wherein the second personalization data defines at least one of the multiple attributes of the first UI element.

13. The computer-readable storage medium of claim 12, wherein the method further comprises:

transmitting the first combined personalization information to the application.

14. The computer-readable storage medium of claim 12, wherein the method further comprises:

receiving new personalization data associated with the first UI element;

selecting applicable personalization data from the collection of personalization data based on a role; and modifying the applicable personalization data based on the new personalization data.

15. The computer-readable storage medium of claim 12, wherein the method further comprises:

receiving a proposed modification to selected personalization data from the collection of personalization data;

identifying a role associated with the proposed modification; and determining whether the proposed modification is authorized for the role.

16. The computer-readable storage medium of claim 12, wherein the method further comprises:

receiving a proposed modification to selected personalization data from the collection of personalization data, the selected personalization data corresponding to a selected personalization; and determining whether the proposed modification is permitted by a different personalization.

17. A computer-readable storage medium storing a program for causing a computer to perform a method, the method comprising:

transmitting context information and an identification of a selected group of UI elements of a user interface of a running application to a repository, wherein the user interface comprises multiple UI elements, the repository comprising personalization data corresponding to one or more available personalizations for each UI element in a collection of UI elements;

for each UI element in the selected group of UI elements, receiving personalization information for the UI element from the repository, the personalization information comprising the personalization data corresponding to one or more applicable personalizations for the UI element, the applicable personalizations comprising a selection of one or more of the available personalizations for the UI element based on the context information;

for each UI element in the selected group of UI elements, displaying the UI element in the user interface, while the application is running, according to the personalization information for the UI element;

receiving first user input, the first user input comprising an invocation of application functionality associated with one or more of the UI elements in the selected group of UI elements;

uniquely marking the one or more UI elements to distinguish the one or more UI elements from all other elements of the user interface;

receiving second user input, the second user input comprising an invocation of personalization functionality associated with one or more of the UI elements in the selected group of UI elements, the personalization functionality being defined in a common personalization interface, the second user input further comprising new personalization data for one or more of the UI elements in the selected group of UI elements;

displaying the selected group of UI elements in the user interface, while the application is running, according to the new personalization data; and transmitting the new personalization data and a specification of a role to the repository, the role indicating one or more of the available personalizations in the repository to which the new personalization data applies.

18. A computer-implemented method comprising:
uniquely marking a first UI element of a user interface of a running application to distinguish the first UI element from all other elements of the user interface, wherein the user interface comprises multiple UI elements;
transmitting context information and an identification of the first UI element to a repository;
receiving, by a computer system, personalization information from the repository for the first UI element, the personalization information comprising first personalization data corresponding to a first personalization associated with the context information, and second personalization data corresponding to a second personalization associated with the context information; and
displaying, by the computer system, the first UI element in an application user interface, while the application is running, according to the personalization information.

19. A computer-implemented method comprising:
receiving, by a computer system, context information and an identification of a first UI element of a user interface of a running application, wherein the user interface comprises multiple UI elements;
selecting first personalization data from a collection of personalization data, the first personalization data corresponding to a first personalization for the first UI element, the first personalization being associated with the context information, the collection of personalization data comprising additional personalization data for the first UI element, and different personalization data for a second UI element;
selecting second personalization data from the collection of personalization data, the second personalization data corresponding to a second personalization for the first UI element, the second personalization being associated with the context information; and
creating, by the computer system, a first combined personalization information for the first UI element by combining the first personalization data and the second personalization data while the running application is running,
wherein the first personalization data defines multiple attributes of the first UI element, and
wherein the second personalization data defines at least one of the multiple attributes of the first UI element.

20. An apparatus comprising:
a memory; and
a processor for:
uniquely marking a first UI element of a user interface of a running application to distinguish the first UI element from all other elements of the user interface, wherein the user interface comprises multiple UI elements,
transmitting context information and an identification of the first UI element to a repository,
receiving personalization information from the repository for the first UI element, the personalization information comprising first personalization data corresponding to a first personalization associated with the context information, and second personalization data corresponding to a second personalization associated with the context information, and
displaying the first UI element in the user interface, while the application is running, according to the personalization information.

21. An apparatus comprising:
a memory; and
a processor for:
receiving context information and an identification of a first UI element of a user interface of a running application, wherein the UI comprises multiple UI elements,
selecting first personalization data from a collection of personalization data, the first personalization data corresponding to a first personalization for the first UI element, the first personalization being associated with the context information, the collection of personalization data comprising additional personalization data for the first UI element, and different personalization data for a second UI element,
selecting second personalization data from the collection of personalization data, the second personalization data corresponding to a second personalization for the first UI element, the second personalization being associated with the context information, and
creating a first combined personalization information for the first UI element by combining the first personalization data and the second personalization data while the application is running,
wherein the first personalization data defines multiple attributes of the first UI element, and
wherein the second personalization data defines at least one of the multiple attributes of the first UI element.

* * * * *

UNITED STATES PATENT AND TRADEMARK OFFICE
CERTIFICATE OF CORRECTION

PATENT NO.         : 7,613,600 B2                              Page 1 of 1
APPLICATION NO. : 10/746272
DATED              : November 3, 2009
INVENTOR(S)        : Rolf Krane It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 997 days.

Signed and Sealed this

Nineteenth Day of October, 2010

David J. Kappos
*Director of the United States Patent and Trademark Office*